(12) United States Patent
Rezania

(10) Patent No.: US 9,010,784 B2
(45) Date of Patent: Apr. 21, 2015

(54) SUSPENSION MECHANISM

(71) Applicant: Parto Rezania, Markham (CA)

(72) Inventor: Parto Rezania, Markham (CA)

( * ) Notice: Subject to any disclaimer, the term of this patent is extended or adjusted under 35 U.S.C. 154(b) by 74 days.

(21) Appl. No.: 13/974,660

(22) Filed: Aug. 23, 2013

(65) Prior Publication Data

US 2015/0054246 A1 Feb. 26, 2015

(51) Int. Cl.
*B60G 3/14* (2006.01)
*B60G 3/04* (2006.01)
*B60G 7/00* (2006.01)

(52) U.S. Cl.
CPC . *B60G 3/04* (2013.01); *B60G 7/001* (2013.01)

(58) Field of Classification Search
CPC .......... B60G 3/185; B60G 3/207; B60G 3/14; B60G 3/12
USPC ............ 280/124.162, 124.165, 687, 681, 682
See application file for complete search history.

(56) References Cited

U.S. PATENT DOCUMENTS

| | | |
|---|---|---|
| 1,165,784 A | 12/1915 | Klingelsmith |
| 1,244,783 A | 10/1917 | Ruckes |
| 1,833,053 A | 11/1931 | McManus |
| 1,857,249 A | 5/1932 | Marcum |
| 1,902,712 A | 3/1933 | Leipert |
| 1,930,208 A | 10/1933 | Marcum |
| 1,940,914 A | 12/1933 | Marcum |
| 1,981,593 A | 11/1934 | Fageol |
| 2,001,846 A | 5/1935 | Ledwinka |
| 2,002,377 A | 5/1935 | Mayne |
| 2,009,963 A | 7/1935 | Matthaei |
| 2,024,148 A | 12/1935 | Dahl |
| 2,050,693 A | 8/1936 | Favary |
| 2,060,015 A | 11/1936 | Barnes et al. |
| 2,062,233 A | 11/1936 | Poleler |
| 2,069,399 A | 2/1937 | White |
| 2,072,044 A | 2/1937 | Widman et al. |
| 2,085,662 A | 6/1937 | Johnson |
| 2,097,309 A | 10/1937 | Sanders, Jr. |
| 2,110,819 A | 3/1938 | Polrer |
| 2,121,862 A | 6/1938 | Dodge |
| 2,127,618 A | 8/1938 | Riemenschneider |
| 2,172,173 A | 9/1939 | Peterman |
| 2,173,515 A | 9/1939 | Eklund |
| 2,175,562 A | 10/1939 | Frohlich |
| 2,194,199 A | 3/1940 | Ash |
| 2,194,323 A | 3/1940 | Peterman |
| 2,194,964 A | 3/1940 | Wilson |
| 2,205,723 A | 6/1940 | Hansen |
| 2,208,601 A | 7/1940 | Ronning |
| 2,212,453 A | 8/1940 | Perkins |
| 2,217,817 A | 10/1940 | Ronning |
| 2,226,100 A | 12/1940 | Larison |
| 2,227,762 A | 1/1941 | Ronning |

(Continued)

*Primary Examiner* — Nicole Verley
(74) *Attorney, Agent, or Firm* — Elias Borges

(57) ABSTRACT

A suspension unit is disclosed having a hanger having a front face with an aperture and a control arm having a front face with an aperture. The control arm is pivotally attached to and depends from the hanger such that the front face of the hanger and the front face of the control arm are opposed one another with the aperture on the front face of the hanger being aligned with the aperture on the front face of the control arm. A jounce spring and a rebound spring are coaxially mounted to a shaft. The shaft is mounted through the apertures and springs. The rebound spring is positioned between the front faces of the hanger and the control arm and the jounce spring is positioned horizontally to one side of both the hanger and the control arm with the shaft in a horizontal orientation.

16 Claims, 4 Drawing Sheets

(56) References Cited

U.S. PATENT DOCUMENTS

| | | | |
|---|---|---|---|
| 2,236,695 A | 4/1941 | Peterman | |
| 2,239,849 A | 4/1941 | Judd | |
| 2,240,022 A | 4/1941 | Saives | |
| 2,253,217 A | 8/1941 | Wenthe | |
| 2,254,552 A | 9/1941 | Tjaarda | |
| 2,270,022 A | 1/1942 | Price | |
| 2,277,615 A | 3/1942 | Townsend | |
| 2,286,609 A | 6/1942 | Ledwinka | |
| 2,297,465 A | 9/1942 | Froehlich | |
| 2,308,969 A | 1/1943 | Riesing | |
| 2,336,814 A | 12/1943 | Suter | |
| 2,349,289 A * | 5/1944 | Larison | 280/677 |
| 2,386,988 A | 10/1945 | Sullivan | |
| 2,395,640 A | 2/1946 | Pearson | |
| 2,411,885 A | 12/1946 | Larison | |
| 2,453,388 A | 11/1948 | Schramm | |
| 2,457,567 A | 12/1948 | Kuns | |
| 2,465,098 A | 3/1949 | Inskeep | |
| 2,490,311 A | 12/1949 | Levesque du Rostu | |
| 2,497,072 A | 2/1950 | Cooper | |
| 2,507,980 A | 5/1950 | Knapp | |
| 2,540,279 A | 2/1951 | Mosler | |
| 2,554,261 A | 5/1951 | Munger | |
| 2,566,393 A | 9/1951 | Wolfe | |
| 2,575,065 A | 11/1951 | Merry | |
| 2,576,824 A | 11/1951 | Bush | |
| 2,597,122 A | 5/1952 | Mullen et al. | |
| 2,607,431 A | 8/1952 | Buckendale | |
| 2,609,217 A | 9/1952 | Hess | |
| 2,612,387 A | 9/1952 | Ronning | |
| 2,621,942 A | 12/1952 | Getz | |
| 2,631,842 A | 3/1953 | Oppenlander et al. | |
| 2,632,655 A | 3/1953 | King et al. | |
| 2,641,464 A | 6/1953 | Linn | |
| 2,684,237 A | 7/1954 | Kayler | |
| 2,706,009 A | 4/1955 | Schramm | |
| 2,706,113 A | 4/1955 | Hickman | |
| 2,730,375 A | 1/1956 | Reimspiess et al. | |
| 2,740,640 A | 4/1956 | Schaefer | |
| 2,760,787 A | 8/1956 | Muller | |
| 2,779,602 A | 1/1957 | Kimbro et al. | |
| 2,794,650 A | 6/1957 | Schilberg | |
| 2,806,710 A | 9/1957 | Mascaro | |
| 2,807,831 A | 10/1957 | Tageler | |
| 2,822,100 A | 2/1958 | Pesta | |
| 2,822,186 A | 2/1958 | Lires | |
| 2,825,578 A | 3/1958 | Walker | |
| 2,861,811 A | 11/1958 | Lassen | |
| 2,862,635 A | 12/1958 | Christenson et al. | |
| 2,862,724 A | 12/1958 | Stover | |
| 2,865,031 A | 12/1958 | Maloney | |
| 2,870,928 A | 1/1959 | Haggard et al. | |
| 2,876,466 A | 3/1959 | Baldwin | |
| 2,876,922 A | 3/1959 | Holiday | |
| 2,877,010 A | 3/1959 | Gouirand | |
| 2,892,634 A | 6/1959 | Leroy | |
| 2,914,339 A | 11/1959 | Gouirand | |
| 2,916,296 A | 12/1959 | Muller | |
| 2,919,760 A | 1/1960 | Fehlberg et al. | |
| 2,964,331 A | 12/1960 | Sherman | |
| 2,977,132 A | 3/1961 | Bainbridge | |
| 2,988,374 A | 6/1961 | Boyles | |
| 3,031,203 A | 4/1962 | Christenson et al. | |
| 3,054,636 A | 9/1962 | Wessells | |
| 3,063,737 A | 11/1962 | Coughran | |
| 3,078,104 A | 2/1963 | Chalmers | |
| 3,096,085 A | 7/1963 | Owens | |
| 3,108,836 A | 10/1963 | Deckert | |
| 3,113,686 A | 12/1963 | Sundin | |
| 3,130,688 A | 4/1964 | Gutridge et al. | |
| 3,140,880 A | 7/1964 | Masser | |
| 3,147,023 A | 9/1964 | Raymo | |
| 3,149,856 A | 9/1964 | Schilberg | |
| 3,171,669 A | 3/1965 | Barenyi | |
| 3,180,510 A | 4/1965 | Moller | |
| 3,181,877 A | 5/1965 | McHenry | |
| 3,201,142 A | 8/1965 | Danguthier | |
| 3,210,047 A | 10/1965 | Jackson | |
| 3,214,047 A | 10/1965 | Moye | |
| 3,254,899 A | 6/1966 | Vorrhies | |
| 3,271,046 A | 9/1966 | Evans et al. | |
| 3,277,975 A | 10/1966 | Van Winsen | |
| 3,282,603 A | 11/1966 | Barth | |
| 3,331,627 A | 7/1967 | Schroder et al. | |
| 3,332,701 A | 7/1967 | Masser | |
| 3,345,104 A | 10/1967 | Ulicki | |
| 3,356,386 A | 12/1967 | Taylor | |
| 3,361,443 A | 1/1968 | Wolf | |
| 3,384,384 A | 5/1968 | Diehl | |
| 3,405,778 A | 10/1968 | Martin | |
| 3,477,738 A | 11/1969 | Manning | |
| 3,534,977 A | 10/1970 | Wessel | |
| 3,563,596 A | 2/1971 | Davis | |
| 3,573,882 A | 4/1971 | Van Winsen | |
| 3,578,352 A | 5/1971 | Heine | |
| 3,601,424 A | 8/1971 | Badland | |
| 3,601,426 A | 8/1971 | Hury | |
| 3,661,419 A | 5/1972 | Mitamura et al. | |
| 3,662,647 A | 5/1972 | King | |
| 3,672,698 A | 6/1972 | Froumajou | |
| 3,689,103 A | 9/1972 | Meulendyk | |
| 3,704,029 A | 11/1972 | Bailleux | |
| 3,704,898 A | 12/1972 | Schmidt | |
| 3,713,665 A | 1/1973 | Gouirand | |
| 3,736,002 A | 5/1973 | Grosseau | |
| 3,737,173 A | 6/1973 | Boissler et al. | |
| 3,746,363 A | 7/1973 | Borns | |
| 3,751,061 A | 8/1973 | Scheuerpflug | |
| 3,752,493 A | 8/1973 | McWhorter | |
| 3,763,950 A | 10/1973 | Rockwell | |
| 3,773,348 A | 11/1973 | Davis | |
| 3,778,082 A | 12/1973 | Grosseau | |
| 3,779,576 A | 12/1973 | Malcolm | |
| 3,781,032 A | 12/1973 | Jones | |
| 3,784,218 A | 1/1974 | Stone | |
| 3,788,683 A | 1/1974 | Rumell | |
| 3,794,343 A * | 2/1974 | Hickman | 280/124.128 |
| 3,797,850 A | 3/1974 | Stout et al. | |
| 3,807,752 A | 4/1974 | Mauck | |
| 3,811,697 A | 5/1974 | Armstrong | |
| 3,820,813 A | 6/1974 | Moulton et al. | |
| 3,822,098 A | 7/1974 | Rudder et al. | |
| 3,829,118 A | 8/1974 | Gouirand | |
| 3,831,210 A | 8/1974 | Ow | |
| 3,866,935 A | 2/1975 | Nelson | |
| 3,868,129 A | 2/1975 | Grosseau | |
| 3,873,120 A | 3/1975 | Lecomte et al. | |
| 3,880,445 A | 4/1975 | Chieger | |
| 3,884,502 A | 5/1975 | Wagner | |
| 3,891,231 A | 6/1975 | Snoberger | |
| 3,904,219 A | 9/1975 | Guerriero | |
| 3,918,739 A | 11/1975 | Kirkland | |
| 3,944,248 A | 3/1976 | Herrman | |
| 3,961,826 A | 6/1976 | Sweet et al. | |
| 3,966,223 A | 6/1976 | Carr | |
| 3,974,926 A | 8/1976 | Kopaska | |
| 3,992,027 A | 11/1976 | Legueu | |
| 4,008,902 A | 2/1977 | Dill | |
| 4,032,167 A | 6/1977 | Chereda | |
| 4,039,037 A | 8/1977 | Vin | |
| 4,040,640 A | 8/1977 | Begg | |
| 4,047,736 A | 9/1977 | Prive | |
| 4,058,325 A | 11/1977 | Schramm | |
| 4,060,145 A | 11/1977 | Kingman et al. | |
| 4,061,353 A | 12/1977 | Kingman et al. | |
| 4,063,611 A | 12/1977 | Anderson | |
| 4,063,745 A | 12/1977 | Olson | |
| 4,065,153 A | 12/1977 | Pringle | |
| 4,085,945 A | 4/1978 | Bicht et al. | |
| 4,089,384 A | 5/1978 | Ehrenberg | |
| 4,095,818 A | 6/1978 | Smith | |
| 4,114,712 A | 9/1978 | Finta | |
| 4,131,209 A | 12/1978 | Manning | |
| 4,155,570 A | 5/1979 | Wiley, Jr. | |

(56) References Cited

U.S. PATENT DOCUMENTS

| | | |
|---|---|---|
| 4,166,640 A | 9/1979 | Van Denberg |
| 4,168,075 A | 9/1979 | Matschinsky |
| 4,202,564 A | 5/1980 | Strader |
| 4,230,341 A | 10/1980 | Hart et al. |
| 4,231,144 A | 11/1980 | Bernacchia, Jr. |
| 4,248,455 A | 2/1981 | Manning |
| 4,252,340 A | 2/1981 | Egging |
| 4,261,591 A | 4/1981 | Warne, Jr. |
| 4,273,357 A | 6/1981 | Pashkow |
| 4,274,338 A | 6/1981 | Uozumi |
| 4,302,022 A | 11/1981 | Schoeffler et al. |
| 4,339,224 A | 7/1982 | Lamb |
| 4,343,506 A | 8/1982 | Saltzman |
| 4,422,667 A | 12/1983 | Perry |
| 4,427,213 A | 1/1984 | Raidel, Jr. |
| 4,434,998 A | 3/1984 | Kaltwasser |
| 4,465,298 A | 8/1984 | Raidel, Sr. |
| 4,468,739 A | 8/1984 | Woods et al. |
| 4,470,615 A | 9/1984 | Scheuerle |
| 4,473,238 A | 9/1984 | Antoine |
| 4,483,546 A | 11/1984 | Brearley |
| 4,488,736 A | 12/1984 | Aubry et al. |
| 4,509,790 A | 4/1985 | Nagamoto et al. |
| 4,527,486 A | 7/1985 | Baird et al. |
| 4,530,515 A | 7/1985 | Raidel |
| 4,541,653 A | 9/1985 | Raidel |
| 4,558,886 A | 12/1985 | Straub |
| 4,580,798 A | 4/1986 | Roelofs |
| 4,580,808 A | 4/1986 | Smith-Williams |
| 4,593,930 A | 6/1986 | Davis |
| 4,596,304 A | 6/1986 | Teshima |
| 4,615,539 A | 10/1986 | Pierce |
| 4,619,578 A | 10/1986 | Routledge |
| 4,623,162 A | 11/1986 | Weitzenhof et al. |
| 4,630,840 A | 12/1986 | Masuda |
| 4,666,181 A | 5/1987 | Wegner |
| 4,671,525 A | 6/1987 | Ribi |
| 4,673,328 A | 6/1987 | Shiels |
| 4,674,770 A | 6/1987 | Inagaki |
| 4,677,263 A | 6/1987 | Hamilton et al. |
| 4,708,361 A | 11/1987 | Takada et al. |
| 4,718,692 A | 1/1988 | Raidel |
| 4,725,074 A | 2/1988 | Stevens |
| RE32,647 E | 4/1988 | Wilson |
| 4,736,958 A | 4/1988 | Armstrong |
| 4,752,177 A | 6/1988 | Zenna |
| 4,759,567 A | 7/1988 | Allen |
| 4,763,953 A | 8/1988 | Chalin |
| 4,811,972 A | 3/1989 | Wiley, Jr. |
| 4,856,839 A | 8/1989 | Scott et al. |
| 4,878,691 A | 11/1989 | Cooper et al. |
| 4,898,508 A | 2/1990 | Hayata |
| 4,903,209 A | 2/1990 | Kaneko |
| 4,915,577 A | 4/1990 | Fraser |
| D307,732 S | 5/1990 | Level |
| 4,930,806 A | 6/1990 | Walker, Jr. |
| 4,934,733 A | 6/1990 | Smith et al. |
| 4,946,189 A | 8/1990 | Manning |
| 4,950,031 A | 8/1990 | Mizunaga et al. |
| 5,015,004 A * | 5/1991 | Mitchell ............... 280/81.6 |
| 5,016,912 A | 5/1991 | Smith et al. |
| 5,035,462 A | 7/1991 | Page et al. |
| 5,050,897 A | 9/1991 | Stromberg |
| 5,052,713 A | 10/1991 | Corey |
| 5,083,812 A | 1/1992 | Wallace |
| 5,094,314 A | 3/1992 | Hayata |
| 5,114,183 A | 5/1992 | Haluda et al. |
| 5,149,132 A | 9/1992 | Ruehl et al. |
| 5,174,628 A | 12/1992 | Hayatsugu et al. |
| 5,178,432 A | 1/1993 | Zeman et al. |
| 5,261,330 A | 11/1993 | Veit-Salomon et al. |
| 5,275,430 A | 1/1994 | Smith |
| 5,308,115 A | 5/1994 | Ruehl et al. |
| 5,342,106 A | 8/1994 | Fischer et al. |
| 5,362,121 A | 11/1994 | Enning et al. |
| 5,364,128 A | 11/1994 | Ide |
| 5,366,237 A * | 11/1994 | Dilling et al. ......... 280/124.116 |
| 5,375,880 A | 12/1994 | Fleenor |
| 5,378,010 A | 1/1995 | Marino et al. |
| 5,379,842 A | 1/1995 | Terry |
| 5,380,029 A | 1/1995 | Portilla |
| 5,391,041 A | 2/1995 | Stanbury et al. |
| 5,409,069 A | 4/1995 | Hake |
| 5,413,368 A | 5/1995 | Pong et al. |
| 5,415,107 A | 5/1995 | Tutzauer |
| 5,433,287 A | 7/1995 | Szalai et al. |
| 5,443,283 A | 8/1995 | Hawkins et al. |
| 5,476,303 A | 12/1995 | Sakamoto et al. |
| 5,505,278 A | 4/1996 | Smith |
| 5,560,639 A | 10/1996 | Nowell et al. |
| 5,577,793 A | 11/1996 | Kobasic |
| D376,564 S | 12/1996 | Mishoe |
| 5,618,151 A | 4/1997 | Rosenkranz |
| 5,632,508 A | 5/1997 | Jacobs et al. |
| 5,673,929 A | 10/1997 | Alatalo |
| 5,676,515 A | 10/1997 | Haustein |
| 5,720,489 A | 2/1998 | Pierce et al. |
| 5,746,441 A | 5/1998 | VanDenberg |
| 5,758,896 A | 6/1998 | Cruise |
| 5,810,544 A | 9/1998 | Wellman |
| 5,820,149 A | 10/1998 | Sobina |
| 5,836,597 A | 11/1998 | Schlosser et al. |
| 5,839,750 A | 11/1998 | Smith |
| 5,860,661 A | 1/1999 | Boucher et al. |
| 5,881,458 A | 3/1999 | Wolf et al. |
| 5,887,880 A | 3/1999 | Mullican et al. |
| 5,921,568 A | 7/1999 | Cruise et al. |
| 5,937,963 A | 8/1999 | Urbanczyk |
| 5,947,550 A | 9/1999 | Mehren et al. |
| 5,951,097 A | 9/1999 | Esposito et al. |
| D417,172 S | 11/1999 | Smith et al. |
| 6,050,586 A | 4/2000 | Wilson |
| 6,062,579 A * | 5/2000 | Fortier ................ 280/124.1 |
| 6,068,276 A | 5/2000 | Kallstrom |
| 6,073,946 A | 6/2000 | Richardson |
| 6,113,180 A | 9/2000 | Corporon et al. |
| 6,142,496 A | 11/2000 | Bartel |
| D434,701 S | 12/2000 | Patmont |
| D436,058 S | 1/2001 | Demers et al. |
| 6,170,875 B1 | 1/2001 | Jones et al. |
| 6,186,733 B1 | 2/2001 | Lewis et al. |
| 6,209,205 B1 | 4/2001 | Rumpel et al. |
| 6,213,507 B1 | 4/2001 | Ramsey et al. |
| 6,234,502 B1 | 5/2001 | Sobina |
| 6,237,926 B1 | 5/2001 | Pritchard et al. |
| 6,249,948 B1 | 6/2001 | Casso |
| 6,299,240 B1 | 10/2001 | Schroeder et al. |
| 6,364,048 B1 | 4/2002 | McComber |
| 6,390,537 B1 | 5/2002 | DiGonis |
| 6,398,251 B1 | 6/2002 | Smith |
| 6,428,026 B1 | 8/2002 | Smith |
| 6,439,131 B1 | 8/2002 | Higgins |
| 6,488,299 B2 | 12/2002 | Kim |
| 6,494,285 B1 | 12/2002 | Williams |
| 6,511,078 B2 | 1/2003 | Sebe |
| 6,520,521 B2 | 2/2003 | Mayfield |
| D473,504 S | 4/2003 | Harbin |
| 6,575,485 B2 | 6/2003 | Durrin |
| 6,575,523 B2 | 6/2003 | Votruba et al. |
| 6,588,778 B1 | 7/2003 | McLaughlin |
| 6,589,098 B2 | 7/2003 | Lee et al. |
| 6,805,369 B2 * | 10/2004 | Galazin ................ 280/124.116 |
| 6,921,098 B2 * | 7/2005 | VanDenberg et al. . 280/124.116 |
| 6,986,519 B2 | 1/2006 | Smith |
| 7,108,271 B2 | 9/2006 | Smith |
| 7,922,185 B2 | 4/2011 | Worman, Jr. |
| 7,931,286 B2 | 4/2011 | Melcher |
| 8,256,782 B2 * | 9/2012 | VanDenberg et al. . 280/124.128 |
| 8,523,208 B2 * | 9/2013 | Rezania et al. ........ 280/124.128 |
| 8,720,922 B2 * | 5/2014 | VanDenberg et al. . 280/124.166 |
| 8,727,363 B1 * | 5/2014 | VanDenberg et al. . 280/124.157 |

(56) References Cited

U.S. PATENT DOCUMENTS

| | | |
|---|---|---|
| 2002/0153690 A1 | 10/2002 | Varela |
| 2003/0001354 A1 | 1/2003 | Pavuk |
| 2003/0010561 A1 | 1/2003 | Bartel |
| 2003/0015848 A1 | 1/2003 | Pham et al. |
| 2003/0094780 A1 | 5/2003 | Cho |
| 2003/0098564 A1 | 5/2003 | Vandenberg et al. |
| 2003/0111866 A1 | 6/2003 | Crean |
| 2003/0125858 A1 | 7/2003 | Lin et al. |
| 2003/0176119 A1* | 9/2003 | Royle .................. 440/12.54 |
| 2010/0253032 A1* | 10/2010 | Ramsey ................ 280/124.162 |

* cited by examiner

SUSPENSION MECHANISM

CROSS REFERENCE TO RELATED APPLICATION

This application is a continuation-in-part application of U.S. application Ser. No. 12/873,675 filed Sep. 1, 2010 which is incorporated herein by reference.

FIELD OF THE INVENTION

The invention relates generally to suspensions, particularly for use with off road vehicles and equipment.

BACKGROUND OF THE INVENTION

Leaf spring suspensions have been developed long time ago and used extensively in many off-road applications but very little changes ever been made to them. In many cases a leaf spring was used primarily as a connecting member (to carry weight of a machine) more so than as a device to isolate and dampen vibration of those machines. A leaf spring alone has little capability to isolate vibration and cushion the ride especially if loads are heavy and terrains are rough. This is mainly due to the fact that a leaf spring member is often subject to forces and bending moments that are imposed in different directions during operation of the vehicle but the design of a simple one-element member simply does not allow flexibility required for proper functioning of a suspension to overcome these simultaneous loads and at the same time to respond and react to them differently and independently. That is why a typical leaf spring used in an off-road application is and has to be very rigid. Consequently the ride quality of the vehicle that uses such springs is more often rough, especially in the empty condition. There is no energy absorbing medium to dampen shocks and reduce natural frequency of vibration of the sprung mass. The spring rate of steel leaf springs is linear and therefore the vibration frequency of the sprung mass significantly changes from empty to loaded conditions.

Springs are a limited life component. They deform (bend or twist) permanently and eventually fail due to fatigue caused by overloading or repeated loading and other unpredictable conditions that may occur. A leaf spring is a homogeneous single-element entity. Once it is cracked, bent, twisted, or broken, the entire leaf needs to be replaced. When that happens it is also very likely that other springs which work with it need to be replaced as well simply because once one spring bends, fails, or is out of service, the others need to carry the additional load and will most likely be impacted by the overload caused by the failure of the first spring. It is also due to the fact that there is no adjustments that can be made to the others to bring them to the same height/orientation of the new spring. The downtime costs plus the cost to service and replace springs could be very expensive.

SUMMARY OF THE INVENTION

The present invention is an improved suspension unit. The suspension unit includes a hanger member having a load bearing portion and a front face with an aperture and a control arm having a front face with an aperture and a load bearing portion. The control arm is pivotally attached to and depends from the hanger such that the front face of the hanger and the front face of the control arm are opposed one another with the aperture on the front face of the hanger being aligned with the aperture on the front face of the control arm and with the load bearing portion of the hanger positioned above the load bearing portion of the control arm. A jounce spring and a rebound spring are coaxially mounted to a shaft, the shaft being mounted through the aperture of the front face of the hanger and the aperture of the front face of the control arm, the rebound spring being positioned between the front face of the hanger and the front face of the control arm, the jounce spring being positioned to one side of both the front face of the hanger and the front face of the control arm. The jounce and rebound springs being positioned to be held in a horizontal orientation with the shaft in a horizontal orientation.

In an alternate embodiment of the present invention, there is provided a tandem suspension consisting of first and second identical suspension units. Each of the suspension units includes a hanger member having a load bearing portion and a front face with an aperture and a control arm having a front face with an aperture and a load bearing portion. The control arm is pivotally attached to and depends from the hanger such that the front face of the hanger and the front face of the control arm are opposed one another with the aperture on the front face of the hanger being aligned with the aperture on the front face of the control arm and with the load bearing portion of the hanger positioned above the load bearing portion of the control arm. A jounce spring and a rebound spring are coaxially mounted to a shaft, the shaft being mounted through the aperture of the front face of the hanger and the aperture of the front face of the control arm, the rebound spring being positioned between the front face of the hanger and the front face of the control arm, the jounce spring being positioned to one side of both the front face of the hanger and the front face of the control arm. The jounce and rebound springs being positioned to be held in a horizontal orientation with the shaft of each suspension unit being positioned to align coaxially in a horizontal fashion. The jounce spring of the first suspension unit is oriented away from the jounce spring of the second suspension unit. Finally, a linkage is provided to link the shaft of the first suspension unit to the shaft of the second suspension unit.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings, like characters of reference indicate corresponding parts in the different figures.

DETAILED DESCRIPTION OF THE INVENTION

In this document the term "axle" refers to the unsprung portion of the vehicle or unsprung mass of the machine but in reality the unsprung mass could be an assembly of its own, which may include an axle but it may also include other components supported by the suspension like a bearing, a bracket that attached the bearing to axle or a shaft with hubs and tines, etc. The vehicle may not even have an axle, in that case we will actually be referring to the spindle/hub/wheel assembly. Frame or Sub-frame is the structural portion of vehicle to which most of the components of the machine as well as the suspensions are attached. "Hanger" is the rigid interface between the frame and the rest of the suspension assembly. Hanger can be attached (welded, bolted, riveted) to frame or sub-frame. "Control Arm" is another rigid member that connects Hanger to the axle. It is pivoted to the Hanger. A Control Arm is normally configured in the assembly as a trailing arm (meaning that its pivot point is towards the front of the vehicle, and its connection to the axle is towards the rear) but in some applications it may be configured the opposite way (as a leading arm). This connection isolates the vibration of unsprung mass from the frame. The bottom attachment of control arm to axle can be either welded, U-bolted, Bolted, clamped, press fitted or any other ways as long as the connections are rigid or semi-rigid.

Figure 4:
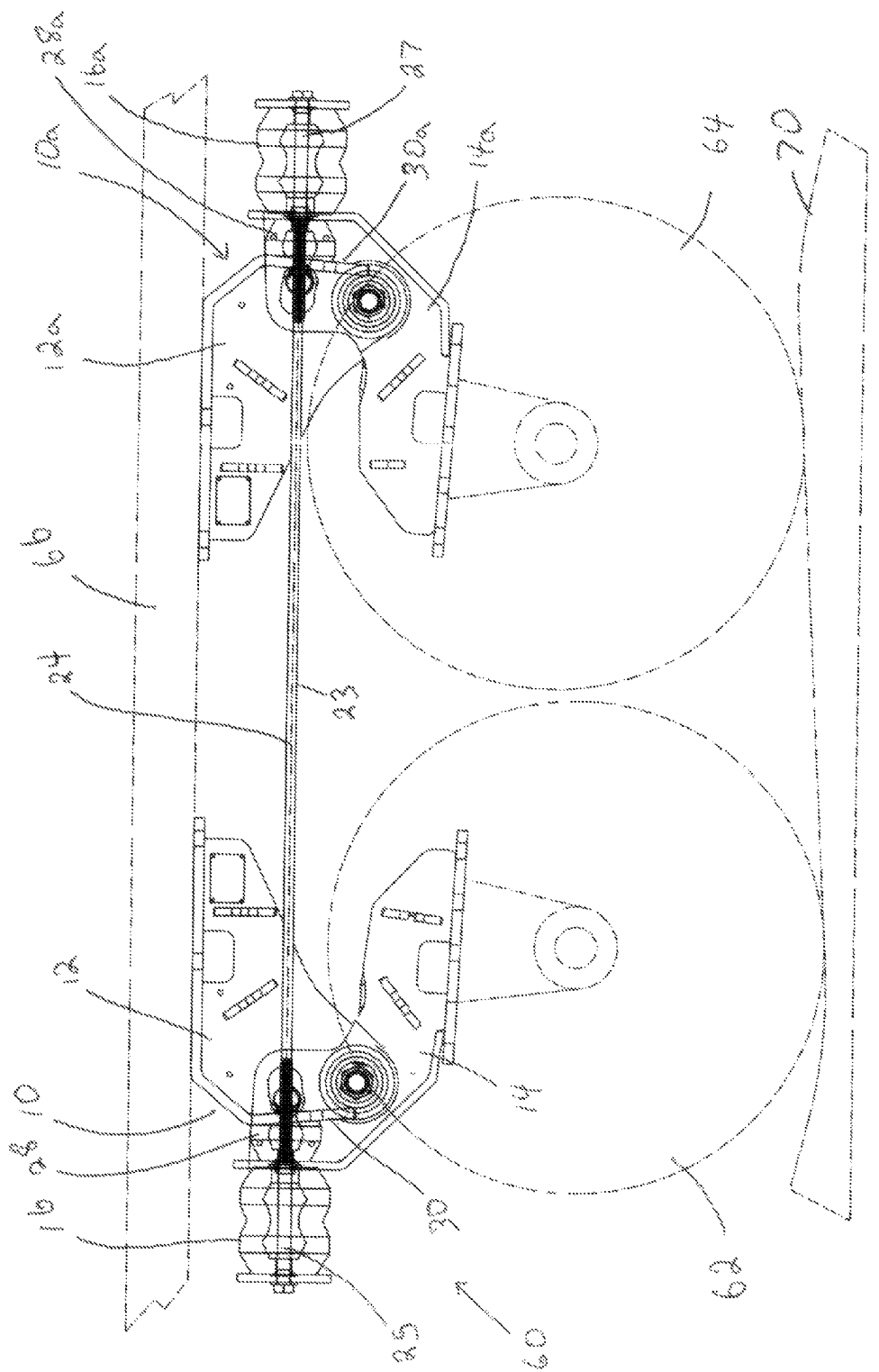
FIG. 4 is a side view of a tandem suspension unit made from two suspension units shown in FIG. 1.

Referring firstly to FIG. 4, the present invention provides a suspension unit which maximizes the clearance between the suspension unit and the ground and which permits a compact modular suspension unit capable of being combined in tandem. A tandem suspension unit, shown generally as item 60, consists of two suspension units 10 and 10a. Suspension units 10 and 10a are identical, the only difference being that suspension unit 10a is turned 180° horizontally relative to suspension unit 10. Suspension unit 10 includes hanger 12, control arm 14, jounce spring 16 and rebound spring 28. Likewise, suspension unit 10a includes hanger 12a, control arm 14a, jounce spring 16a and rebound spring 28a. Suspension units 10 and 10a are linked by elongated bolt 24 having opposite ends 25 and 27. Jounce springs 16 and 16a and rebound springs 28 and 28a are held in a coaxial horizontal orientation by elongated bolt 24 which passes coaxially through the jounce and rebound springs. Hangers 12 and 12a are configured such that faces 30 and 30a, respectively, are positioned at close to a vertical orientation (i.e. perpendicular to elongated bolt 24). As shall be discussed below, positioning faces 30 and 30a in a substantially vertical orientation ensures that the vertical up and down motion of the wheels 62 and 64 relative to the vehicle frame 66 is translated into a horizontal motion in the jounce and rebound springs which is dampened by said jounce and rebound springs. This permits the jounce and rebound springs to be positioned horizontally away from wheels 62 and 64, thereby increasing the clearance between the suspension components and ground 70. Furthermore, elongated bolt 24 acts to link suspension unites 10 and 10a permitting both units to act together providing a smoother ride.

Figure 1:
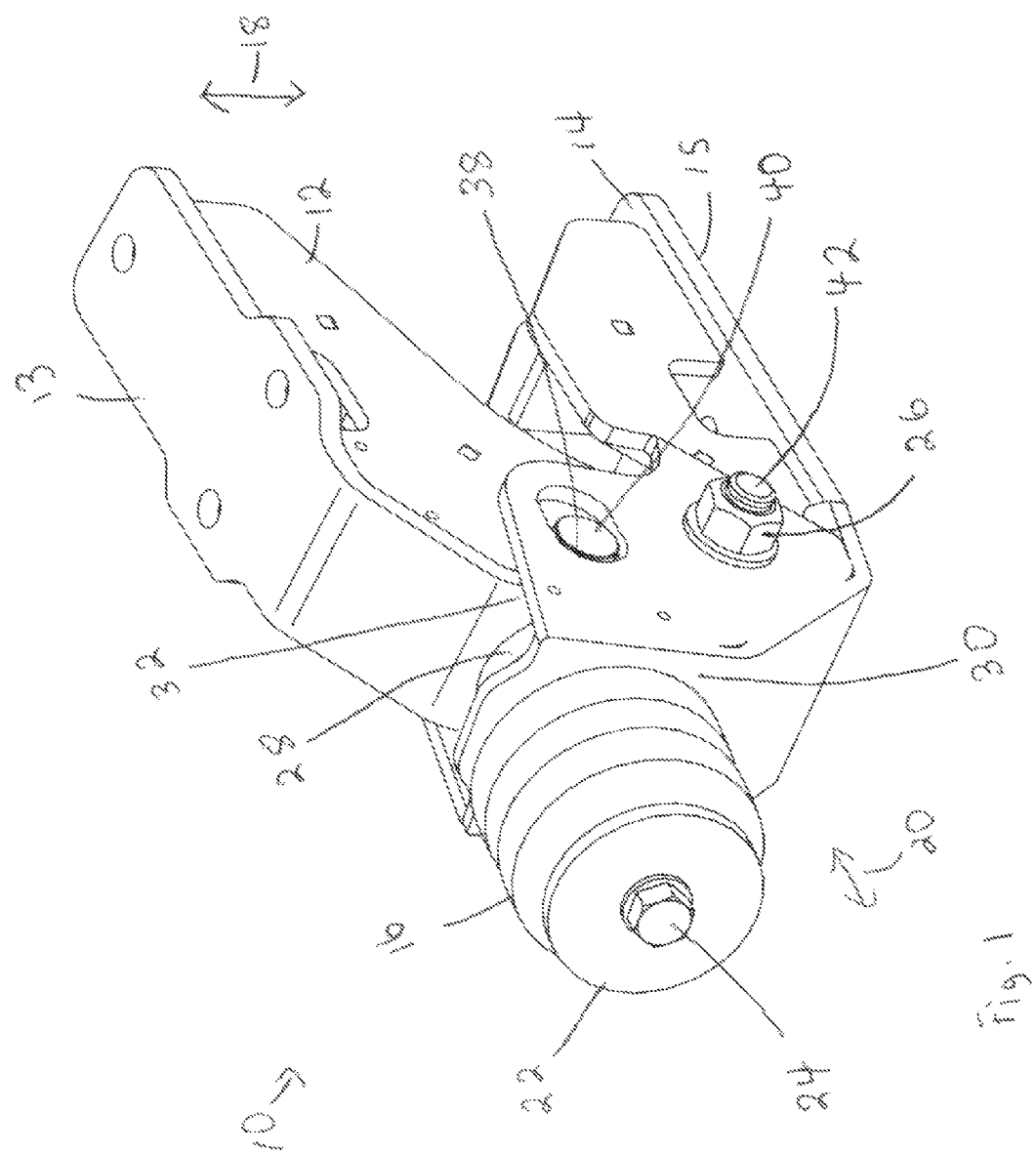
FIG. 1 is a perspective view of a suspension unit made in accordance with the present invention.
Figure 2:
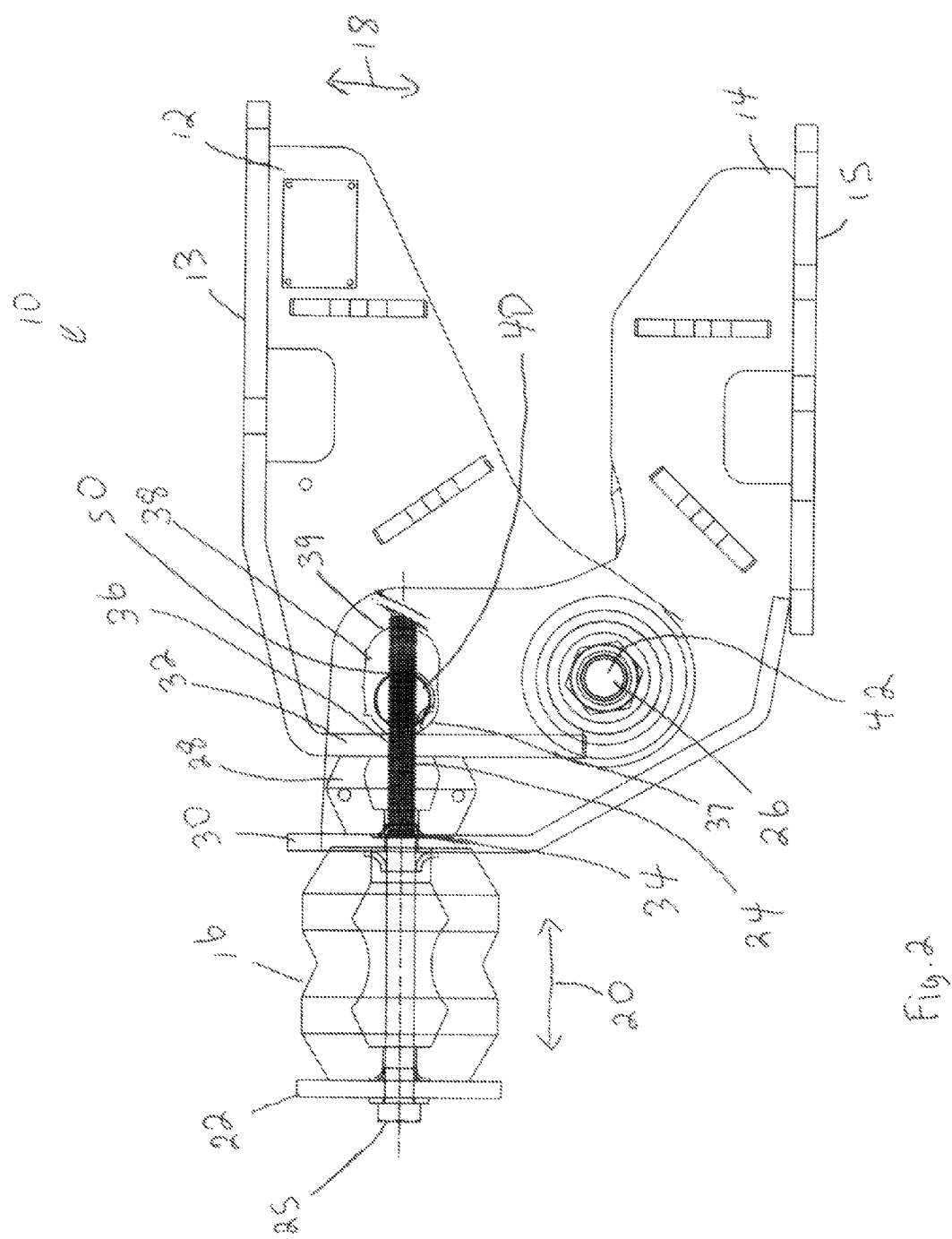
FIG. 2 is a side view of the suspension unit shown in FIG. 1.

Referring now to FIGS. 1 and 2, the specific components of each of the suspension units 10a and 10 will now be discussed. It will be appreciated that since both suspension units 10 and 10a are identical, details of both suspension units will be disclosed by reference to suspension unit 10 alone. It is to be understood that each feature of suspension unit 10 has a corresponding identical feature in suspension unit 10a. As mentioned previously, suspension unit 10 consists of a hanger 12 pivotally coupled to a control arm 14 at pivot 26 with jounce spring 16 and rebound spring 28 coupled to both the hanger and the control arm to dampen the up and down movement of the control arm relative to the hanger. Jounce spring 16 is positioned horizontally to one side of control arm 14. Hanger 12 is basically the rigid interface between the frame and the rest of the suspension assembly. It can be attached to the frame or trailer sub frame of the vehicle by any means commonly available, such as by bolts, rivets or welds. Control arm 14 is a trailing arm that connects hanger 12 to the axle. For the purposes of this patent application, the term "axle" refers to the unsprung portion of the vehicle (not shown) or unsprung mass of the machine (not shown). The unsprung mass could be an assembly of its own which may include the axle but it may also include other components supported by the suspension like a bearing, a bracket that attached the bearing to axle or a shaft with hubs and tines. The connection between the control arm and the unsprung mass isolated the vibration of the unsprung mass from the frame (not shown) of the vehicle or machine. The control arm can be attached to the axle by welding, U-bolts, bolts, clamps or the like provided the connection is strong and either rigid or semi-rigid.

Jounce spring 16 is installed to the side of control arm 14 with its axis oriented in a substantially horizontal fore-aft axis and at the same time perpendicular to axis of the pivot bolt 42. Jounce spring 16 is sandwiched between disc 22 and face 30 of control arm 14. Rebound spring 28 is coaxially aligned with jounce spring 16 but is located between face 32 of hanger 14 and face 30 of control arm 14. Hanger 12 and control arm 14 are configured such that when the suspension unit is installed, faces 30 and 32 are positioned substantially parallel to each other and very close to the vertical. More particularly, hanger 12 has a load bearing portion 13 which is provided for mounting to the frame of a vehicle (not shown) and control arm 14 has load bearing portion 15 which is provided for mounting the wheel (or axel) of the vehicle (not shown). Hanger 12 is configured such that face 32 is perpendicular to load bearing portion 13 and control arm 14 is configured such that face 30 is perpendicular to load bearing portion 15. This ensures that the faces 30 and 32 are substantially parallel and substantially vertical when the suspension unit is installed. This also ensures that jounce spring 16, rebound spring 28 and elongated bolt 24 are horizontally positioned and parallel to load bearing portions 13 and 15, which in turn ensures that the jounce and rebound springs are positioned clear of the rest of the suspension unit.

Figure 3:
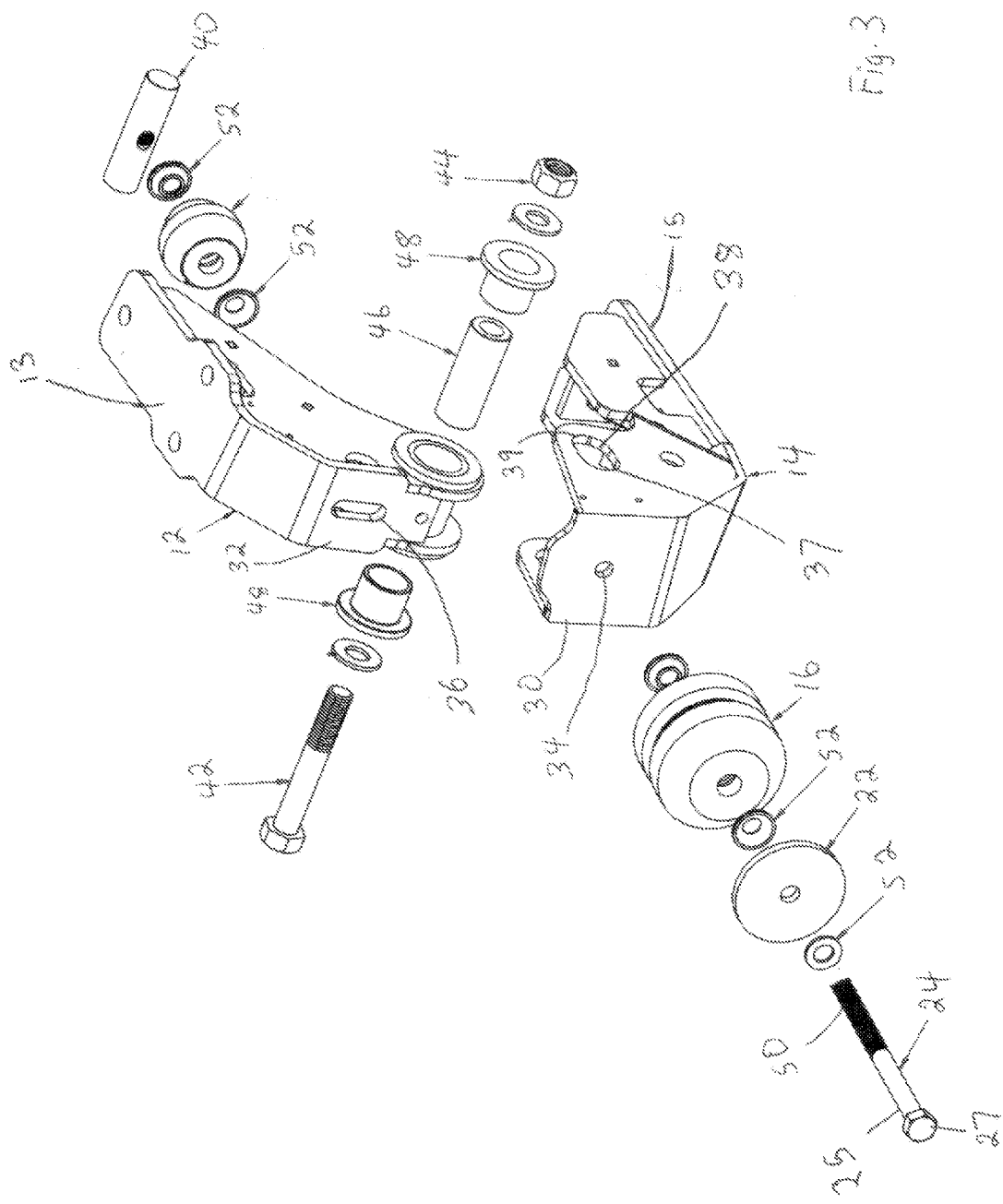
FIG. 3 is an exploded view of the suspension unit shown in FIG. 1.

As best seen in FIGS. 2 and 3, end 25 of elongated bolt 24 attaches both Jounce and Rebound springs to the control arm and to the hanger. It will be noted that in FIGS. 2 and 3, only end 25 of elongated bolt 24 is shown for practical reasons. Elongated bolt 24 passes through aperture 34 in face 30 and slot 36 in face 32 which are coaxially aligned. Elongated bolt 24 has threads 50 which engages into the retaining pin 40. Disc 22 is located ahead of Jounce spring 16 and held in place by a nut 27 attached/formed at the extreme end of bolt 24 (see FIG. 3). As best seen in FIG. 3, cones 52 are provided to align springs 16 and 28 to the axis of bolt 24. They also prevent wear between the bolt and the springs that may happen otherwise.

Retaining pin 40 is inserted horizontally into kidney shaped slot 38 of hanger 14. The axis of the retaining pin 40 is parallel to the pivot bolt 42. Retaining pin 40 is threaded in the middle allowing end 50 of the front bolt 24 to engage into it such that the retaining pin is perpendicular to the front bolt. When retaining pin 40 is installed in the suspension unit, the retaining pin articulates such that the orientation of the threaded section of the retaining pin will be an outcome of the bolt position.

Retaining pin 40 can freely rotate and roll in slot 38 in control arm 14 between ends 37 and 39 of slot 38, allowing front bolt 24 to adjust its angle relative to the frame (not shown) as the suspension articulates up and down. This feature enables bolt 24 to articulate (in a vertical fore-aft plane) and thus eliminates any unnecessary bending moments being induced in the bolt. Retaining pin 40 is also a mechanical stop and a safety device for the suspension. Each end of pin 40 is located in a kidney shaped slot 38 that encompasses the relative motion of the pin during operation of the suspension. When retaining pin 40 reaches to the end of slot 38 it locks the arm to the hanger at the end of the stroke preventing any additional movement at the end of the stroke. This is also a safety device in case something fails. For example it brings the frame to a complete stop in case for any reason jounce spring 16 fails. If the suspension unit 10 is used on an aerator for example (not shown), this last feature will prevent the tines of an Aerator to suddenly strike the frame.

Springs 16 and 28 may comprise any type of spring, such as coil springs, pneumatic springs or resilient polymer springs. Preferably Aeon rubber springs are used since they inherently absorb the kinetic energy during a complete cycle and; therefore, suspensions using them may not need an additional shock absorber. If coil springs are used (or any other spring which is not intrinsically dampening) an additional shock absorber can be used in conjunction with the rest of the suspension assembly to further enhance the ride quality.

Referring back to FIG. 2, during use, hanger 12 and control arm 14 move relative to each other in a relatively vertical up and down direction as indicated by arrow 18. This substantially vertical up and down movement is then translated into a side to side movement of springs 16 and 28 as indicated by arrow 20. The direction of movement of springs 16 and 28 is at an obtuse angle to the direction of movement of control arm 14. This permits the larger spring 16, to be positioned to one side of control arm 14 and not between the control arm and the hanger. It will be appreciated that unit 10 may be flipped 180° vertically such that item 14 is "above" item 12 and the pivot 26 is positioned above elongated rod 24. In such a vertically flipped orientation, item 14 would act as a hanger and item 12 would act as a control arm, but the suspension unit would work in a similar fashion.

Referring back to FIG. 4, elongated bolt 24 links suspension unit 10 with 10a. Elongated bolt 24 may comprise a single long steel bolt, or it may comprise three separate bolts, with ends 25 and 27 being separate bolts linked together by a linkage 23 having ends configured to fasten to ends 25 and 27 by means known generally in the art. Linkage 23 may consist of an elongated rod, but it may also consist of a taught cable capable of transmitting forces between the suspension units. The two identical suspension units (10 and 10a) are positioned back to back (or front to front) with their springs being co-axially connected together using the linkage (either a shaft, rod or cable). This design allows further articulation of the two suspensions and allows further vertical travel of the axle. This is in addition to the deflection of the springs. The two suspension units are mechanically inter-connected and therefore work together in a synchronized manner at all times to compensate for the movement and articulation of the two wheels when the vehicle is moving on the road and following the profile of the road.

In this tandem arrangement, one suspension unit can respond to the behavior of the other suspension unit by virtue of linkage 23. In this tandem orientation, wheel 62 can be made to automatically conform to the movement of wheel 64. For example, wheel 64 may be raised by suspension unit 10a while the linkage between the suspension units causes the suspension unit 10 to lower wheel 62 in response to one of the wheels hitting a bump or pothole. The end result is a smoother more stable ride with greater control.

This design equalizes the load since the tension in the linkage at each end of the linkage is the same. Therefore, the vertical load at each suspension unit would carry will be identical and balanced. Therefore the ride will be improved and stresses on the frame and other components of the suspension will be substantially reduced. Furthermore, the ride height of the tandem suspension can easily be adjusted (reduced or increased) simply by reducing or increasing the length of the linkage.

The present suspension unite improves ride characteristics. The suspension system, as a whole absorbs energy and shock loads both in jounce and rebound. Certain elastomer springs and bushings constantly absorb energy during jounce and rebound of axle when vehicle is in motion. That gives the suspension the ability to dampen shock loads and therefore reduce the amplitude of the vibration for the vehicle body (sprung mass). It provides lower natural frequency for the sprung mass, especially in the empty condition, because unlike steel springs the elastomer springs like rubber have lower spring rates in empty conditions and higher spring rates in loaded conditions. Reducing shock loads would increases life of other components of the machine (like bearings of an aerator equipment). Each side of suspension flexes and reacts independently to conform to the shape of bumps and potholes of the ground, allowing contour-ability to accurately follow uneven land, therefore reducing tension induced in the frame and reducing vibration of the frame and other attachments of the frame.

Since jounce spring is positioned horizontally to the side of the hanger and control arm, and since the elongated bolt is exposed and is easily accessible, the ride height of the suspension can be changed simply by loosening or tightening nut 27 which in turn, changes the pre-load on the springs. That feature is a simple means that can be used to raise or lower the frame to achieve the optimum height necessary to accommodate different loads (to add to the machine or take from it which may be necessary for the same machine that might work in different fields). The stiffness of the suspension can also be adjusted by replacing the springs to harder or softer ones. Alternatively, the stiffness (hardness or softness) of the suspension can be adjusted by changing the preload on the spring (only for nonlinear type springs). Since the jounce spring is positioned to the side of the hanger and control arms, replacing the spring or adjusting bolt 24 can be done in the field and without specialized tools. In fact, the suspension can be easily disassembled and re-assembled. Any part including the spring and bushings can be replaced in the field using ordinary tools.

The location of the Jounce and Rebound springs are chosen such that deflection on the springs (measured along their own axes) would be multiplied with a certain ratio to axle in up-down direction. In other words, the geometry of suspension allows amplifying relative motion between and frame and axle (deflection for the sprung mass) for Off-Road use WITHOUT using larger and taller springs. This feature also helps reduce frequency of vibration and hence further improve ride characteristics.

The suspension also functions quietly. The moving parts of the new suspensions do not squeak since the Elastomer springs themselves do not squeak. There is no steel on steel contact between moving parts. There is no need to lubricate the joint; although lubricated joints can be used in this design as well.

Finally, the suspension unit is very simple to install. Most of the time all it takes to install it is commercially available fasteners and regular tools to mount the suspension to the frame from top and to the axle from bottom. Suspension can be installed on steel, aluminum, or composite type frames.

A specific embodiment of the present invention has been disclosed; however, several variations of the disclosed embodiment could be envisioned as within the scope of this invention. It is to be understood that the present invention is not limited to the embodiments described above.

Therefore, what is claimed is:

1. A suspension unit for suspending a load onto a wheel, the suspension unit comprising:
   a. a hanger member for coupling beneath the load, the hanger member having a load bearing portion and a front face;
   b. a control arm for coupling to the wheel, the control arm having a front face with an aperture and a load bearing portion;
   c. the control arm being pivotally attached to and depending from the hanger at a pivotal attachment point such that the front face of the hanger and the front face of the control arm are opposed one another with an aperture on the front face of the hanger being aligned with the aperture on the front face of the control arm and with the load bearing portion of the hanger positioned above the load bearing portion of the control arm;
   d. a jounce spring and a rebound spring coaxially mounted to a shaft having opposite first and second ends, the shaft being mounted through the aperture of the front face of the hanger and the aperture of the front face of the control arm, the rebound spring being positioned between the front face of the hanger and the front face of the control arm, the jounce spring being positioned to one side of both the front face of the hanger and the front face of the control arm;
   e. the hanger and control arm being configured to position the jounce and rebound springs in an outwardly and horizontal position away from the load bearing portion of the control arm with the shaft positioned horizontally.

2. The suspension unite of claim 1 wherein the jounce spring is oriented away from the load bearing portion of the hanger and the load bearing portion of the control arm, the jounce spring oriented parallel to the load bearing portions of the hanger and control arm.

3. The suspension unit of claim 2 wherein the front face of the hanger is at an angle from the load bearing portion of the hanger and wherein the front face of the control arm is at an angle from the load bearing portion of the control arm, the hanger and control arm being pivotally mounted to each other such that the load bearing portions of the control arm and hanger are parallel to each other.

4. The suspension unit of claim 1 wherein the first end of the shaft is provided with a stop to prevent the jounce spring from slipping off the shaft and wherein the jounce spring is positioned between the stop and one of the faces of the hanger and control arm such that when the load bearing portions of the control arm and the hanger move towards each other the jounce spring is compressed.

5. The suspension unit of claim 4 wherein the second end of the shaft is provided with a retaining pin extending perpendicularly to the shaft, the retaining pin having opposite ends which are engaged in a guide groove formed on one of the hanger and control arm.

6. The suspension unit of claim 5 wherein the guide groove is elongated and has stops formed on opposite ends of the guide groove, the stops configured to limit the relative movement of the hanger and control arm.

7. The suspension unit of claim 6 wherein the guide groove is kidney shaped.

8. The suspension unit of claim 1 wherein the front faces of the hanger and control arm are oriented relative to the load bearing portions of the hanger and control arm, respectively, so as to place the jounce and rebound springs horizontally.

9. The suspension unit of claim 3 wherein the jounce spring is oriented away from the load bearing portion of the hanger and the load bearing portion of the control arm, the jounce spring oriented roughly parallel to the load bearing portions of the hanger and control arm.

10. A suspension unit for suspending a load onto a wheel, the suspension unit comprising:
    a. a hanger member for coupling beneath the load, the hanger member having a load bearing portion and a front face;
    b. a control arm for coupling to the wheel, the control arm having a front face with an aperture and a load bearing portion;
    c. the control arm being pivotally attached to and depending from the hanger at a pivotal attachment point such that the front face of the hanger and the front face of the control arm are opposed one another with an aperture on the front face of the hanger being aligned with the aperture on the front face of the control arm and with the load bearing portion of the hanger positioned above the load bearing portion of the control arm;
    d. a jounce spring and a rebound spring coaxially mounted to a shaft having opposite first and second ends, the shaft being mounted through the aperture of the front face of the hanger and the aperture of the front face of the control arm, the rebound spring being positioned between the front face of the hanger and the front face of the control arm, the jounce spring being positioned to one side of both the front face of the hanger and the front face of the control arm;
    e. the front face of the hanger and the front face of the control arm being positioned perpendicular to the load bearing portions of the hanger and control arm, respectively, so as to position the jounce and rebound springs horizontally away from the load bearing portion of the control arm.

11. The suspension unit of claim 10 wherein the first end of the shaft is provided with a stop to prevent the jounce spring from slipping off the shaft and wherein the jounce spring is positioned between the stop and one of the faces of the hanger and control arm such that when the load bearing portions of the control arm and the hanger move towards each other the jounce spring is compressed.

12. The suspension unit of claim 11 wherein the second end of the shaft is provided with a retaining pin extending perpendicularly to the shaft, the retaining pin having opposite ends which are engaged in a guide groove formed on one of the hanger and control arm.

13. The suspension unit of claim 12 wherein the guide groove is elongated and has stops formed at opposite ends of the guide groove, the stops configured to limit the relative movement of the hanger and control arm.

14. The suspension unit of claim 13 wherein the guide groove is kidney shaped.

15. A suspension comprising a first and second identical suspension units as defined in claim 1, the suspension units being oriented such that the jounce spring of the first suspension unit is oriented opposite to the jounce spring of the second suspension unit and the shafts of each of the suspension units are aligned, the suspension further comprising a linkage coaxially linking the shafts of the first and second suspension units.

16. A suspension comprising first and second identical suspension units as defined in claim 10, the suspension units oriented such that the jounce spring of the first suspension unit is oriented opposite to the jounce spring of the second suspension unit and the shafts of each of the suspension units are aligned, the suspension further comprising a linkage coaxially linking the shafts of the first and second suspension units.

* * * * *